United States Patent [19]

Nishiki

[11] Patent Number: 5,101,421
[45] Date of Patent: Mar. 31, 1992

[54] X-RAY IMAGING APPARATUS

[75] Inventor: Masayuki Nishiki, Ootawara, Japan

[73] Assignee: Kabushiki Kaisha Toshiba, Kawasaki, Japan

[21] Appl. No.: 620,641

[22] Filed: Dec. 3, 1990

Related U.S. Application Data

[63] Continuation-in-part of Ser. No. 357,753, May 26, 1989, Pat. No. 4,991,192.

[30] Foreign Application Priority Data

Jun. 2, 1988 [JP] Japan .................. 63-136353
Dec. 4, 1989 [JP] Japan .................. 1-313288

[51] Int. Cl.$^5$ ........................................ H05G 1/64
[52] U.S. Cl. ........................ 378/99; 378/98; 358/111
[58] Field of Search ............ 378/99, 98, 145, 91, 378/114, 115; 358/111

[56] References Cited

U.S. PATENT DOCUMENTS 4,612,572 9/1986 Komatsu et al. ............ 378/99
4,901,336 2/1990 Nishiki ...................... 378/99
4,991,192 2/1991 Nishiki ...................... 378/99

Primary Examiner—Janice A. Howell
Assistant Examiner—Don Wong
Attorney, Agent, or Firm—Finnegan, Henderson, Farabow, Garrett and Dunner

[57] ABSTRACT

An X-ray imaging apparatus comprises an X-ray generator, an image intensifier for converting an X-ray image of a subject under examination to an optical image, a solid state image sensor for picking up the optical image of the image intensifier, a driver circuit for driving the solid state image sensor and a television monitor for visually displaying an image signal obtained from the solid state image sensor as an X-ray optical image. The X-ray generator is controlled such that an X-ray pulse is not emitted during an interval in which the solid state image sensor transfers charges from image sensing sections to charge storage sections.

5 Claims, 4 Drawing Sheets

X-RAY IMAGING APPARATUS

CROSS-REFERENCES TO RELATED APPLICATION

This is a continuation-in-part application of patent application Ser. No. 357,753 filed on May 26, 1989 now U.S. Pat. No. 4,991,192.

BACKGROUND OF THE INVENTION

1. Field of the Invention

The present invention relates to an X-ray imaging apparatus which displays X-ray images as TV images.

2. Description of the Related Art

An X-ray imaging apparatus comprises an X-ray tube for directing X rays onto a subject under examination, an image intensifier adapted to convert an X-ray image formed of X rays transmitted through the subject to an optical image, a television camera for picking up the optical image produced on the image intensifier and a television monitor for visually displaying a picture signal from the TV camera.

A conventional X-ray imaging apparatus utilizes a television camera using a pickup tube such as a vidicon or saticon. With such a TV camera, various noise components of the signal are large relative to the desired signal, thus reducing dynamic range. A dynamic range of 60-70 dB cannot be provided. As a result, the picture quality is deteriorated. Furthermore, the residual image effect is noticeable, and the resolution is reduced because of the broadening of the beams.

SUMMARY OF THE INVENTION

It is accordingly an object of the present invention to provide an X-ray imaging apparatus which increases the dynamic range and eliminates residual images.

According to the present invention, there is provided an X-ray imaging apparatus comprising an X-ray tube for emitting X rays onto a subject; an image intensifier for converting an X-ray image of the subject to an optical image; a solid state image sensor for sensing up the optical image produced by the image intensifier; a driver circuit for driving the solid state image sensor; and a television monitor for visually displaying a picture signal obtained from the solid state image sensor as an X-ray image, the X-ray tube being controlled not to emit X rays during a time interval in which signal charges are transferred from image sensing sections to charge storage sections.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
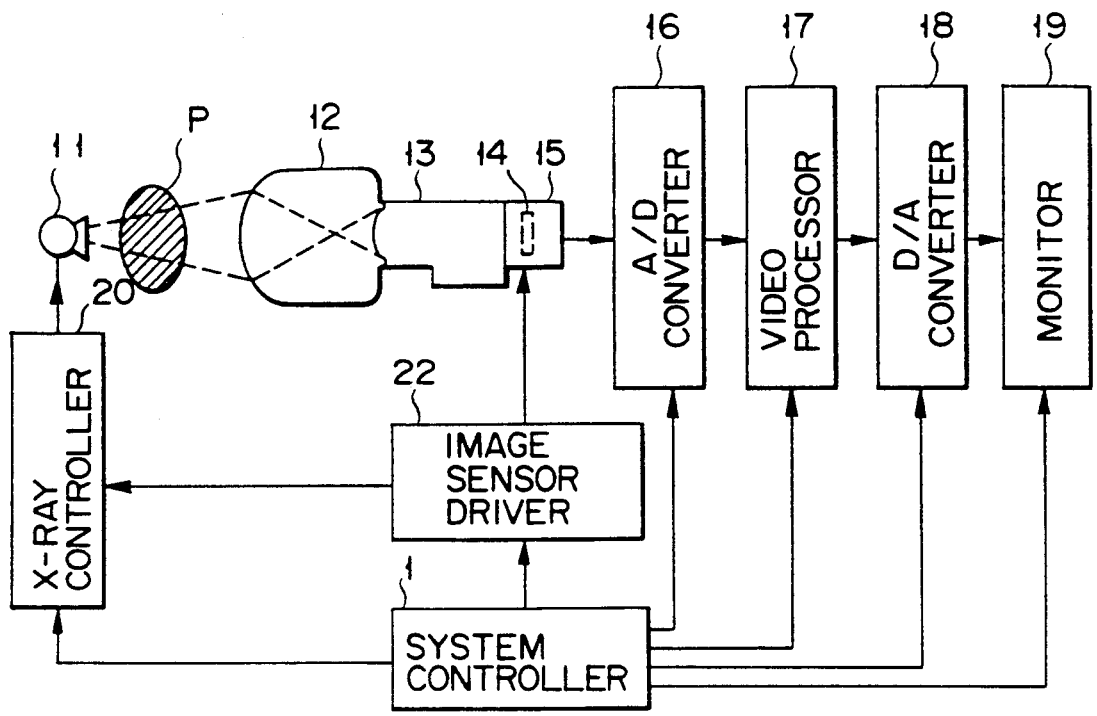
FIG. 1 is a block diagram of an X-ray imaging apparatus embodying the present invention.
Figure 2:
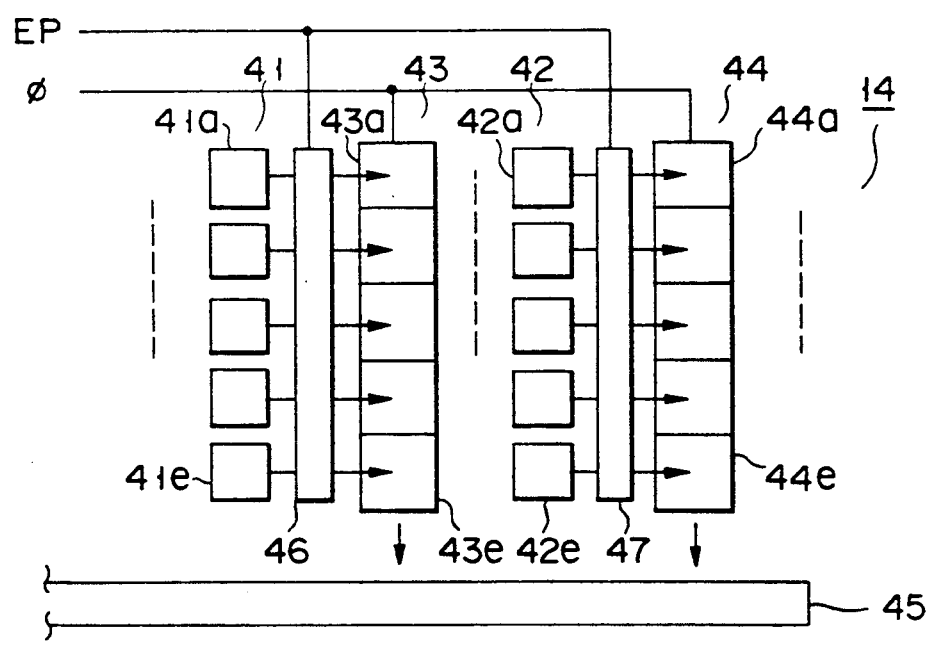
FIG. 2 illustrates a solid state image sensor.

Referring now to FIG. 1, an X-ray tube 11 for emitting X rays and an image intensifier 12 for converting an X-ray image to an optical image oppose each other with a subject P under examination disposed there-between. The output surface of image intensifier 12 and a TV camera 15 are disposed with an optical system 13 there-between. TV camera 15 contains a solid state image sensor 14. As shown in FIG. 2, solid state image sensor 14 comprises charge storage sections 41 and 42 comprising charge storage elements (e.g., photodiodes) 41a–41e and 42a–42e, respectively, vertical charge transfer sections (CCDs) 43 and 44 formed adjacent to charge storage sections 41 and 42, respectively. The solid state image sensor 14 further comprises a horizontal charge transfer section (CCD) 45 for transferring charges from the vertical transfer sections horizontally and gate sections 46 and 47 between the charge storage sections and the horizontal transfer section.

Although the gate sections 46 and 47 may be used to control charge transfer, the voltage applied to the vertical charge transfer sections 43 and 44 may alternatively be controlled to facilitate charge transfer from the charge transfer section 41 (42) to the charge transfer section 43 (44). This alternative method for controlling the voltage provides an advantage wherein the electrodes of the solid state image sensor can be reduced in number.

TV camera 15 has its output coupled to a video processor 17 via an A/D converter 16. Video processor 17 performs signal processing, such as filtering, on an image signal output from solid state image sensor 14 which has been converted to a digital signal by A/D converter 16. Video processor 17 has its output coupled to a TV monitor 19 via a D/A converter 18.

X-ray tube 11 is connected to an X-ray controller 20, which in turn is connected to a system controller 11 and a CCD driver 22. The X-ray controller 20 responds to a system control signal and a field shift pulse to apply a high voltage to X-ray tube 11. System controller 11 provides timing control signals to image sensor driver 22, A/D converter 16, video processor 17, D/A converter 18 and monitor 19 as well as X-ray controller 20 so as to control these circuits totally. System controller 12 may be comprised of a CPU.

Figure 3:
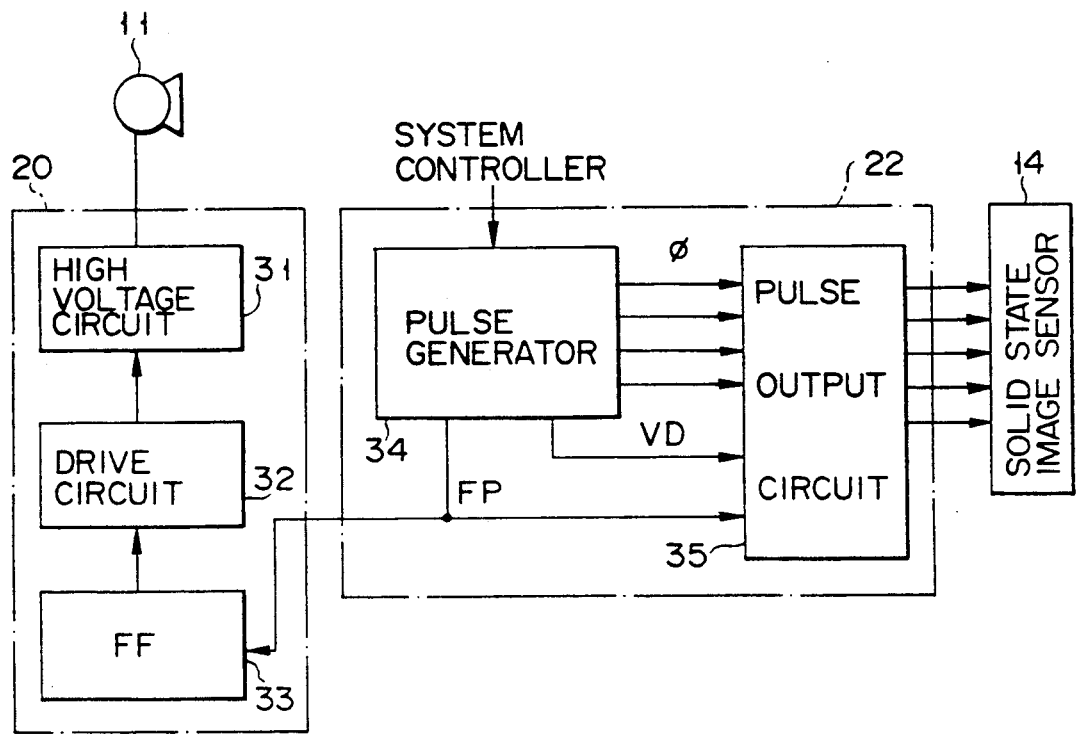
FIG. 3 shows block diagrams of an X-ray controller and a CCD driver.

As shown in FIG. 3, image sensor driver 22 comprises a pulse generator 34 for providing vertical and horizontal transfer pulses $\phi$, vertical sync pulses VD and field shift pulses FP. Image sensor driver 22 further comprises a pulse output circuit 35. Image sensor driver 22 responds to a control signal from system controller 21 input to the pulse generator 34. The pulse output circuit 35 provides drive pulses to solid state image sensor 14. The field shift pulse FP is also applied to X-ray controller 20.

X-ray controller 20 is connected to X-ray tube 11 for emitting X-rays to the subject and comprises a voltage circuit 31 for providing a high voltage to X-ray tube 11, a drive circuit 32 for providing drive pulses for driving high voltage circuit 31 and a flip-flop 33 for controlling drive circuit 32. X-ray controller 20 controls the X-ray tube 11 such that X rays are not emitted during the transfer of charges from the charge storage section to the charge transfer section of the solid state image sensor 14.

Figure 4:
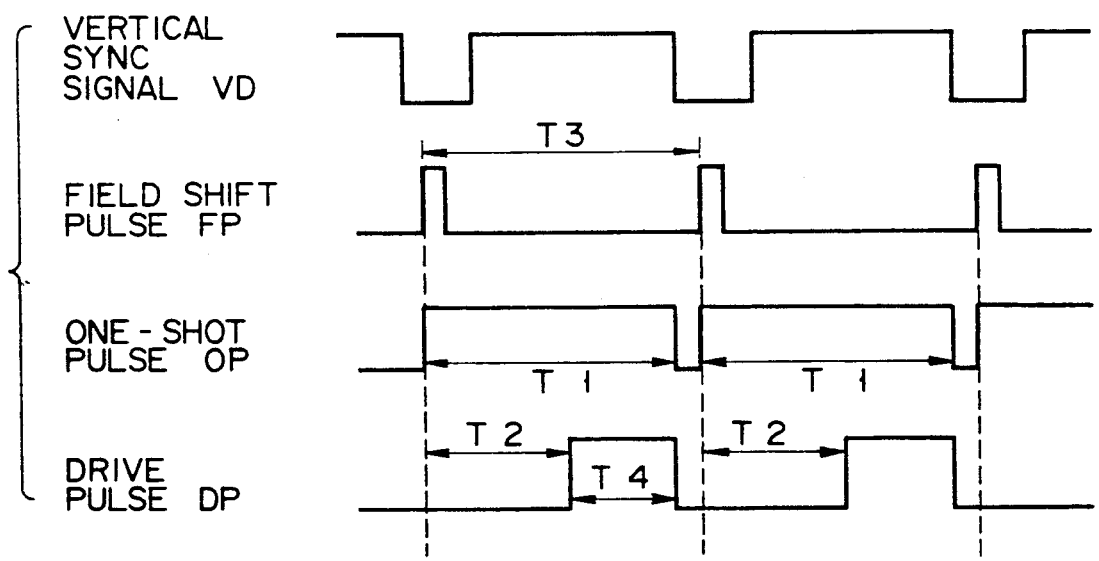
FIG. 4 is a timing diagram which is useful for explaining the driving operation of the solid state image sensor.

In operation, system controller 21 applies the control signals to the various circuits. In image sensor driver 22, pulse generator 34 responds to a system control signal and outputs the transfer pulses $\phi$, and the vertical sync signal VD and the field shift pulse FP, which are all shown in FIG. 4. The field shift pulse FP is produced during a vertical blanking interval of the vertical sync signal VD. The field shift pulse is produced at a pulse interval T3. Those pulses are amplified and shaped in pulse output circuit 35 and then applied to solid state image sensor 14.

Upon receipt of the field shift pulse FP flip-flop 33 of X-ray controller 20 responds to the rising edge of pulse FP to produce a one-shot pulse OP with a pulse width T1 (<T3) less than one field interval (or one frame interval), which is applied to drive circuit 32. Drive circuit 32 provides the drive pulse DP to high voltage circuit 31 after a delay of T2 from the rise of one-shot pulse OP having a pulse width T4. High voltage circuit 31 responds to the drive pulse DP to provide a high voltage to X-ray tube 11 which is thus energized. X-ray tube 11 directs X rays to subject P. X rays transmitted through the subject enter image intensifier 12 to produce an X-ray optical image. The optical image is projected onto the pickup surface of solid state image sensor 14 via optical system 13. At this point charges corresponding to the optical image are stored in charge storage sections 41 and 42.

When time T1 (=T2+T4) lapses in the above operation, drive circuit 32 causes drive pulse DP to go low in response to the falling edge of one-shot pulse OP. At this point, high voltage circuit 31 stops production of the high voltage, so that X-ray radiation from X-ray tube 11 is terminated. Thereafter, pulse generator 34 produces the next field pulse FP, which is applied to gates 46 and 47 of solid state image sensor 14 to open the gates. The charges are then transferred from charge storage sections 41 and 42 to vertical charge transfer sections 43 and 44 via gates 46 and 47.

The charges in vertical charge transfer sections 43 and 44 are vertically transferred at high speed by shift pulse $\phi$ and then fed to A/D converter 16 through horizontal charge transfer section 45 as an image signal. A/D converter 16 converts the image signal to a digital signal which is, in turn, output to video processor 17. Video processor 17 performs signal processing, such as filtering, on the digital image signal and provides the resultant signal to D/A converter 18 for conversion to an analog image signal. The analog image signal is applied to monitor 19 as a TV signal and visually displayed as an X-ray optical image.

When the subsequent field shift pulse is generated, flip-flop 33 responds to the rising edge of the field shift pulse to provide a one-shot pulse of pulse width T1 to driver circuit 32 again. Driver circuit 32 then provides a drive pulse DP to high voltage circuit 31 after a delay of T2 as in the previous operation. High voltage circuit 31 applies a high voltage to X-ray tube 11 to energize it. X-ray tube 11 directs X rays onto subject P again. As a result, an X-ray image corresponding to a second video field is picked up and then displayed.

According to the present invention, as described above, the generation of X rays is stopped during an interval in which the charges stored in the charge storage section of the solid state image sensor are being shifted to the charge transfer section by the field shift pulse produced in a vertical blanking interval. Hence, undesired charges will not be mixed with the charges which are being transferred. Successive images can, therefore, be obtained which have good in time resolution. The optical image is picked up by use a solid state image sensor. Thus, large quantities of charges can be stored and the dynamic range of the system can be increased.

Figure 5:
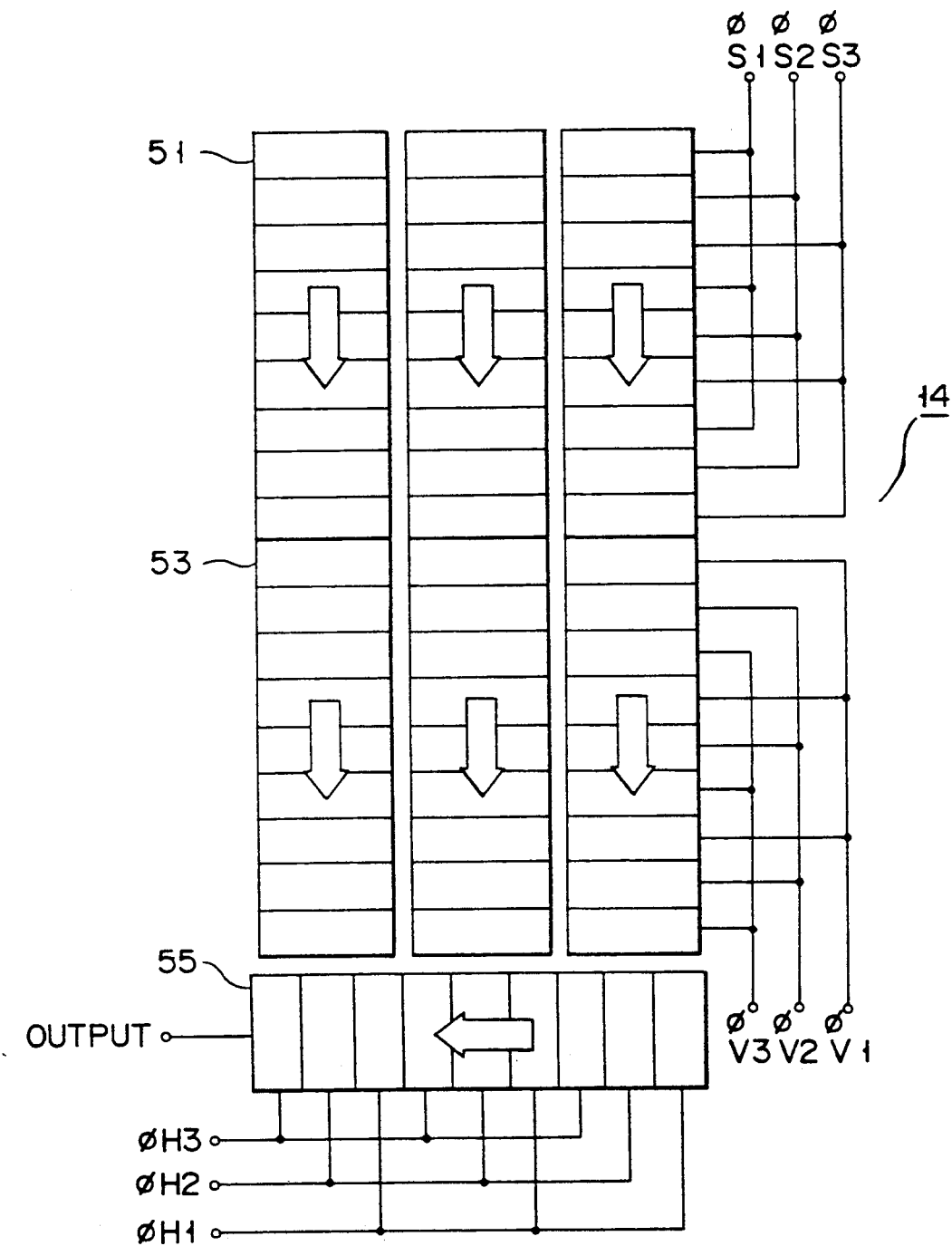
FIG. 5 illustrates an arrangement of a solid state image sensor of a frame transfer type which is used for an X-ray imaging apparatus according to another embodiment.

The above embodiment uses a solid state image sensor of an interline transfer type, but the present invention may use a solid state image sensor 14 of a frame transfer type as shown in FIG. 5. The frame transfer type image sensor 14 comprises a plurality of image sensing sections 51, a plurality of charge storage sections 53 provided in correspondence with the image sensing sections 51, and a horizontal transfer section 55 provided on the output portion of the charge storage sections 53. The image sensing sections 51 each sense an optical image projected from the optical system 13, and storing and transferring the signal charges corresponding to the optical image to the charge transfer sections 53. The charge transfer sections each receive the signal charges transferred from the image sensing sections 51 in synchronism with high speed transferring pulses (described hereinafter). The horizontal transfer section 55 transfers in a horizontal direction the signal charges transferred from the charge storage sections 53.

Figure 6:
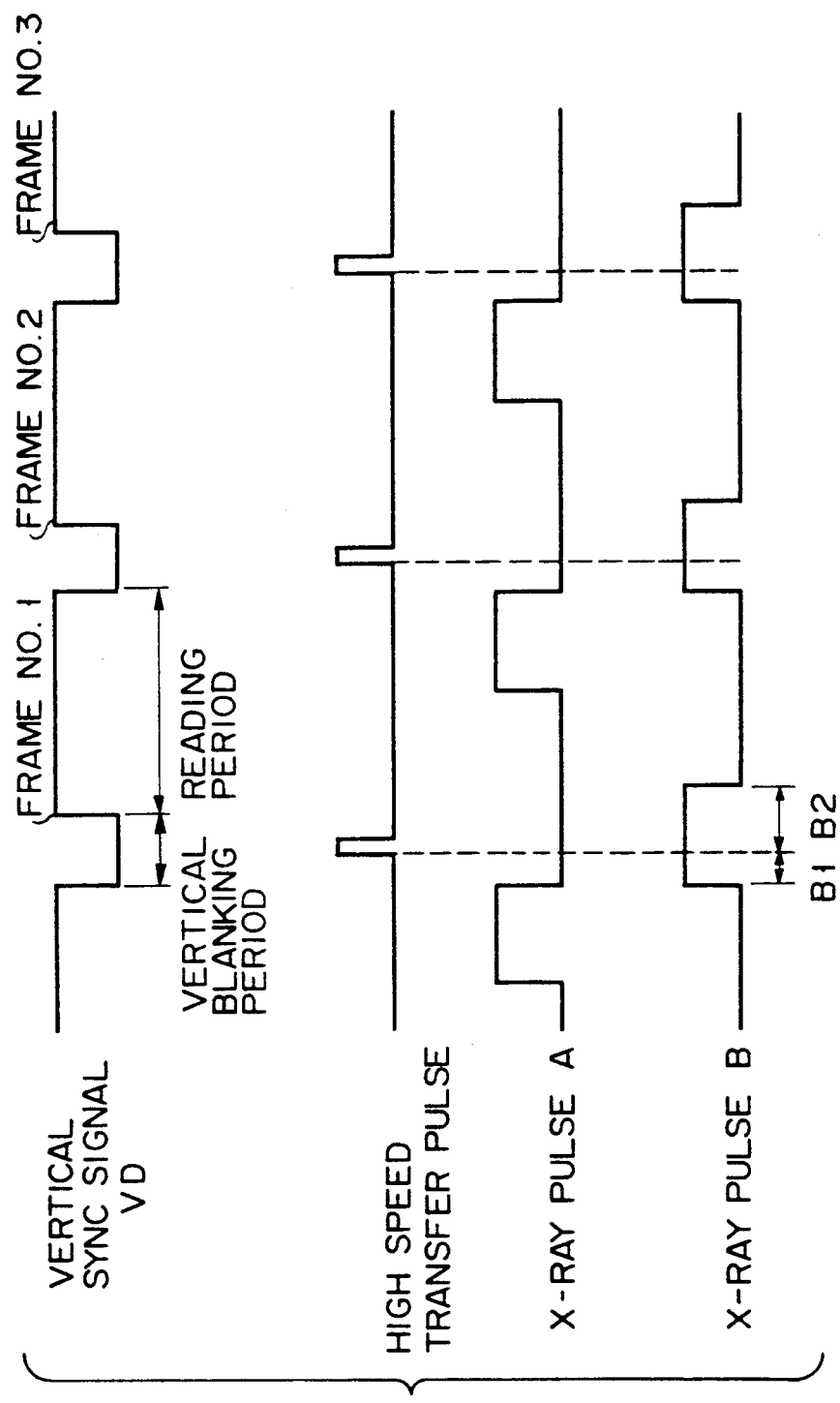
FIG. 6 is a timing diagram which is useful for explaining the driving operation of the solid state image sensor of FIG. 5.

There will now be describes the operation of the frame transfer type image sensor 14 referring to the timing chart of FIG. 6.

In this embodiment, the image sensor 14 is scanned in accordance with a non-interlaced scanning system. The vertical synchronizing signal VD has a vertical blanking period (L) and a signal reading period (H) during which the image signals are read out from horizontal transfer section 55 every frame, for example, frames No. 1, No. 2 . . . are sequentially read out therefrom.

The high speed transferring pulses are used for transferring the signal charges from the image sensing sections 51 to the charge storage sections 53. The image sensor driver 22 is controlled by the system controller 1 so that the high speed transferring pulse becomes a high level during the blanking time interval.

Where the solid state image sensor 14 comprises a frame transfer type solid state image sensor driven by three phases as shown in FIG. 2, three phase driving pulses are supplied to the terminals $\phi_{S1}$, $\phi_{S2}$, $\phi_{S3}$ and $\phi_{V1}$, $\phi_{V2}$, $\phi_{V3}$.

All signal charges stored in the image sensing sections 51 and corresponding to one field are transferred in parallel to the charge storage sections 53. The one-field signal charges transferred to the charge storage section 53 are transferred one by one scanning line to the horizontal transfer section 55 by the vertical transfer pulses supplied to the terminals $\phi_{S1}$, $\phi_{S2}$, $\phi_{S3}$ and $\phi_{H1}$, $\phi_{H2}$, $\phi_{H}$. The signal charges are sequentially shifted in the horizontal transfer section 55 and transferred to the output terminal.

All the signal charges in the image sensing section 51 are transferred to the charge storage section 43 during the time interval in which the high speed transferring pulse is "H" level, for example, 1 μsec × 500 = 500 μsec, when 500 pixels are transferred by the transferring pulses of 1 MHz. The X-ray pulse A is used for causing the X-rays emit from the X-ray tube 1. The X-ray pulse A is generated at the timing such that the high speed transferring pulse is not high during a high level time of the X-ray pulse A. In other words, the X-rays are not irradiated from the X-ray tube during the charge transferring time during which the charges are transferred from the image sensing section 51 to the charge transfer section 53, i.e., during the generation time of the high speed transferring pulse.

In contrast, when the X-ray pulse is high during the high level time of the high speed transferring pulse as shown in the X-ray pulse B, the following problems occur. In the first, the signal charges corresponding to the X-ray pulse B during the time B1 are read out during the time corresponding to the frame No. 1, while the signal charges corresponding to the X-ray pulse B during the time B2 are output during the time corresponding to the frame No. 2. In other words, the image signal corresponding to a single X-ray pulse B is divided into two frame signals, resulting in remarkably decreasing the time-resolution of the displayed image. In the secondary, a smear occurs in the display image since a light is incident into the image sensor during the time of the charge transferring from the image sensing section 51 to the charge storage section 53. In order to avoid such problems, in the invention, the pulsed X-rays are emitted at the timing of the X-ray pulse A.

There will now be described hereinafter the operation of the embodiment.

The X-ray controller 20 is controlled in accordance with the generation timing of the X-ray pulse A by the system controller 1, and controls the X-ray tube 11 so as to irradiate X-rays to a subject (i.e. patient) P. The X-rays passing through the subject P are amplified and converted into an optical image by the image intensifier 12. The optical image is converted to an image signal by the image sensor 14. In this case, the image sensor 14 is driven by the drive pulses output from the image sensor driver 22 timing-controlled by the system controller 1. That is, the signal charges corresponding to the optical image are transferred from the image sensing section 51 to the charge storage section 53 in accordance with the generation timing of the high speed transferring pulses. Then, the signal charges are transferred from the charge storage section 53 to the horizontal transfer section 55. The signal charges in the horizontal transfer section 55 is read out one by one frame as a television video signal during the signal reading time. The television video signal is converted into a digital video signal by the A/D converter 16. The digital video signal is subjected to, for example, a filtering process by the video processor 17, and is supplied to the D/A converter 18 and converted into an analog video signal thereby. The analog video signal is displayed as an X-ray image on the monitor 19.

As described above, according to the embodiment, since X-rays are not irradiated from the X-ray tube during a charge transferring time, i.e., the time during which the signal charges are transferred from the image sensing section 51 to the charge storage section, or high level time of the high speed transferring pulse, the X-ray image signal corresponding to a single X-ray pulse A is output within one frame without fail, and this one frame includes only one X-ray image information. As a result, the X-ray imaging apparatus produces continuous images having a good time-resolution. Also, a smear does not occur, since an undesired light is not incident into the image sensor during the charge transferring time from image sensing section to the charge storage section.

In the above embodiment, since the high speed transferring pulse is normally output during a vertical blanking time, the X-ray controller 20 is controlled by the system controller 1 so that X-rays may be irradiated from the X-ray tube 11 during a vertical blanking time.

In the above embodiment, the generation of X rays may alternatively be controlled by a vertical blanking pulse, rather than the field shift pulse. Furthermore, because the quantity of X rays required may vary depending on a subject under examination, the delay time T2 of the drive pulse may be set to an arbitrary value to adjust the arbitrary quantity of X rays emitted. Corresponding adjustment of times T1 and T2 will allow a desired quantity of X rays to be generated at a desired point of time within the video field.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An X-ray imaging apparatus comprising:
 X-ray generating means for irradiating a subject with X-rays;
 image intensifier means for converting X-rays transmitted through the subject to an optical image;
 solid state image sensor means for detecting the optical image produced by said image intensifier means and outputting an image signal, said solid state image sensor means including image sensing sections for converting the optical image into signal charges and charge storage sections for storing and transferring the signal charges;
 driver means for driving said solid state image sensor means;
 X-ray control means for controlling said X-ray generating means to prevent the X-rays from being emitted during a charge transfer time interval in which the signal charges are transferred from said image sensing sections to said charge storage sections of said solid state image sensor means; and
 a television monitor for visually displaying the image signal from said solid state image sensor means as an X-ray optical image.

2. An X-ray imaging apparatus according to claim 1, wherein said driver means comprises means for supplying high speed transferring pulses during the charge transfer time interval to said image sensing sections and said charge storage sections to vertically transfer the signal charges one by one field from said image sensing sections to said charge storage sections.

3. An X-ray imaging apparatus according to claim 1, wherein said image sensor means includes a horizontal transfer means for transferring in a horizontal direction the signal charges transferred from said charge storage means every one scanning line to an output terminal.

4. An X-ray imaging apparatus according to claim 1, wherein said X-ray control means includes means for supplying an X-ray generation pulse to said X-ray generating means to cause pulsed X-rays irradiate therefrom when the charge transfer from said image sensing means to said charge storage means is completed.

5. An X-ray imaging apparatus comprising:

X-ray generating means for irradiating a subject with pulsed X-rays;

image intensifier means for converting X-rays transmitted through the subject to an optical image;

solid state image sensor means for detecting the optical image produced by said image intensifier means and outputting an image signal, said solid state image sensor means including image sensing sections for converting the optical image into signal charges, charge storage sections and a horizontal transfer section, said charge storage sections having a function for storing and transferring the signal charges to said horizontal transfer section;

driver means for generating high speed transfer pulses for transferring the signal charges from said image sensing sections to said image storage sections;

X-ray control means for supplying an X-ray generation signal to said X-ray generating means to cause the pulsed X-rays irradiate from said X-ray generating means when the signal charges have been transferred from said image sensing sections to said charge storage sections of said solid state image sensor means; and a television monitor for visually displaying the image signal from said solid state image sensor means as an X-ray optical image.

* * * * *